No. 708,973. Patented Sept. 9, 1902.
H. SCHMIDT.
PNEUMATICALLY OPERATED LUBRICATOR.
(Application filed Dec. 13, 1901.)
(No Model.) 2 Sheets—Sheet 2.
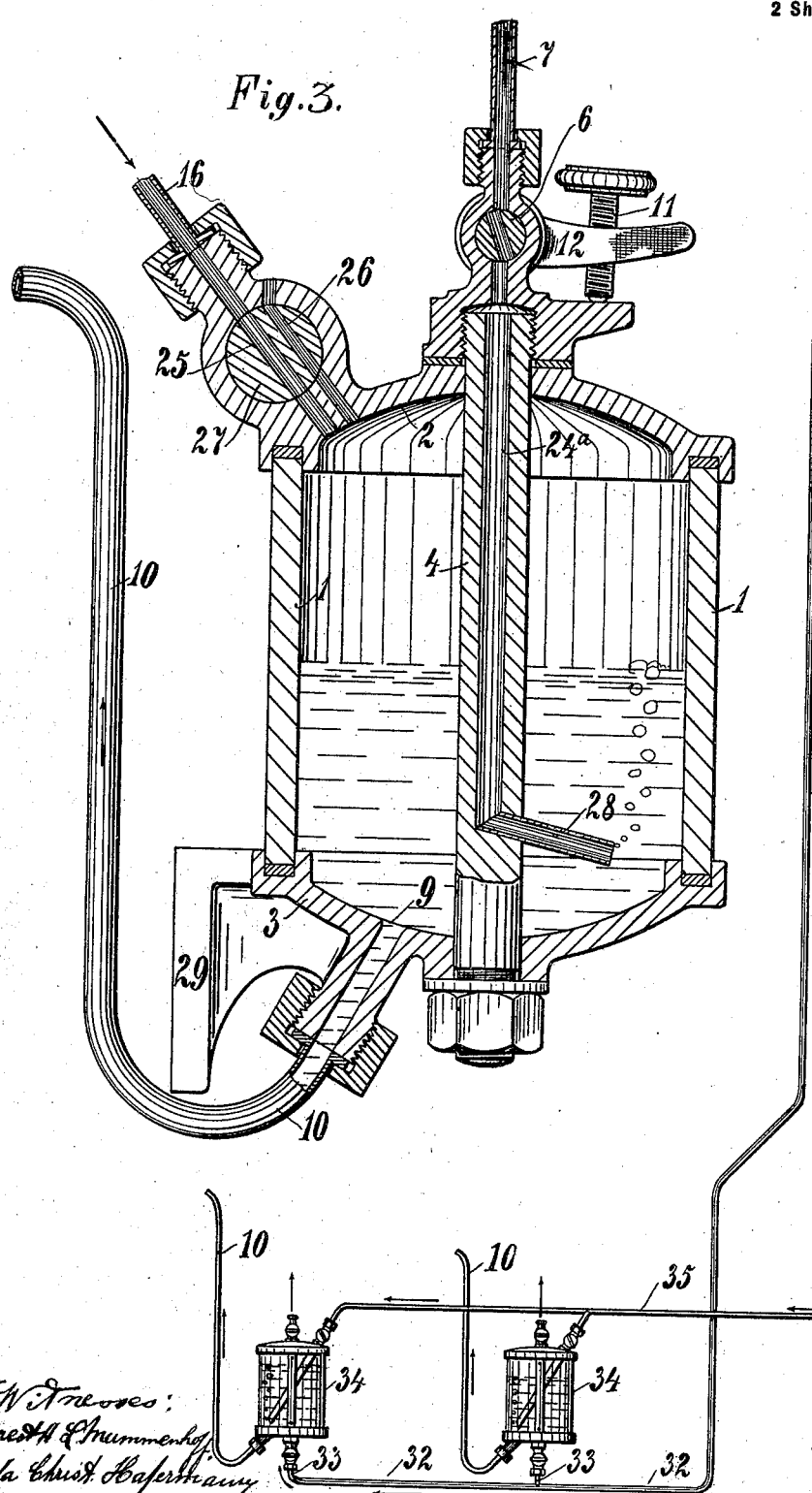
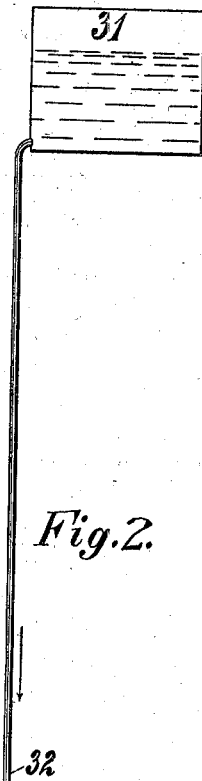

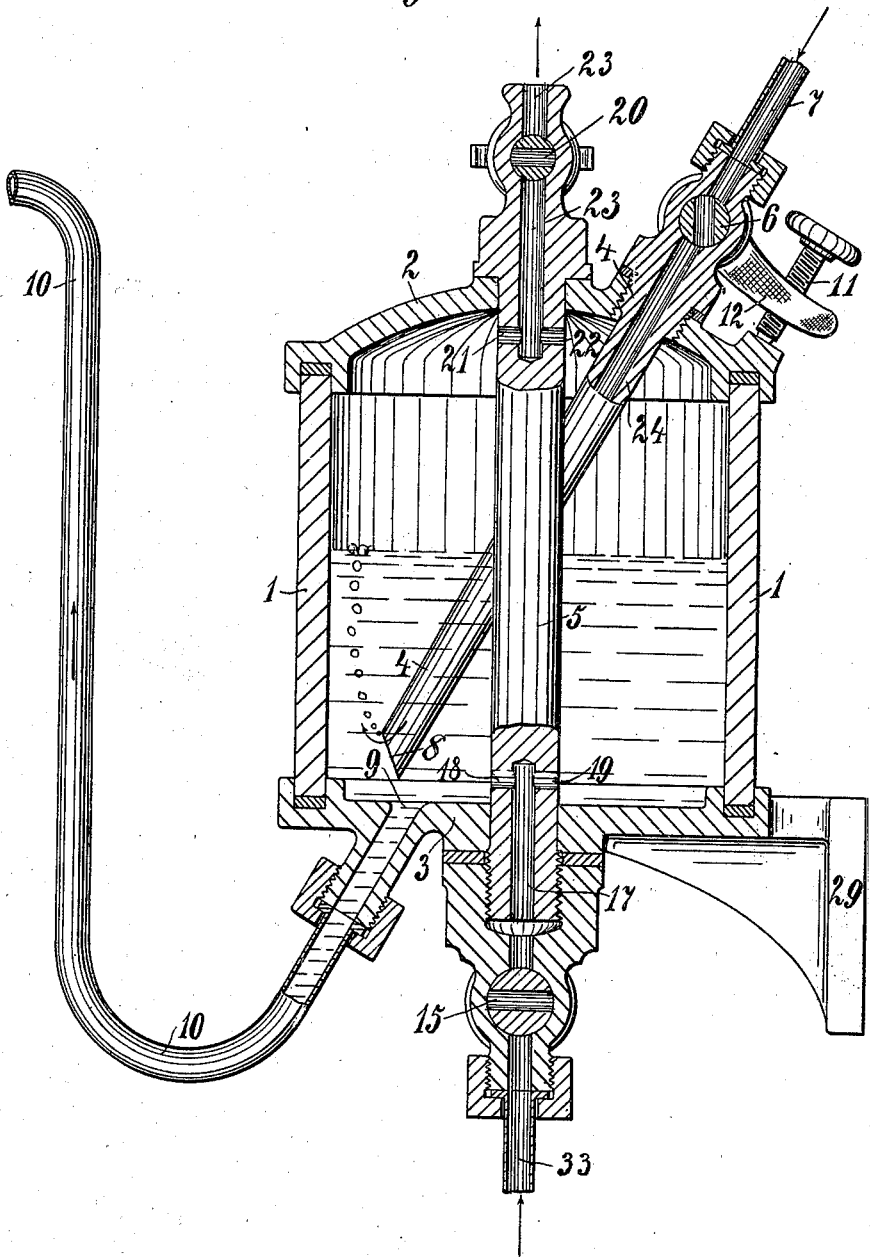

UNITED STATES PATENT OFFICE.

HERMANN SCHMIDT, OF HAMBURG, GERMANY.

PNEUMATICALLY-OPERATED LUBRICATOR.

SPECIFICATION forming part of Letters Patent No. 708,973, dated September 9, 1902.

Application filed December 13, 1901. Serial No. 85,765. (No model.)

*To all whom it may concern:*

Be it known that I, HERMANN SCHMIDT, a subject of the German Emperor, residing and having my post-office address at Herderstrasse 64, Hamburg, Germany, have invented certain new and useful Improvements in and Relating to Pneumatically-Operated Lubricators, of which the following is a specification.

The present invention relates to a lubricating device in which the lubricant is conveyed by compressed air from the reservoirs to the parts to be lubricated.

In the annexed drawings, Figure 1 represents a vertical cross-section of the reservoir of the lubricant. Fig. 2 is a diagrammatic elevation of the arrangement of a group of such lubricating devices, showing the system of conduits for the oil and compressed air. Fig. 3 represents a modification of the lubricator-reservoir in vertical cross-section.

The lubricating apparatus comprises a series of transparent lubricator-reservoirs, all of which work automatically. The cylindrical glass body 1 of each of these reservoirs is hermetically closed at its ends by the plates 2 and 3, respectively. In Fig. 3 the said plates are held tightly against the cylinder by the screw-spindle 4, in Fig. 1 by the screw-spindle 5. Each lubricator-reservoir is connected with a compressed-air-supply pipe by means of a conduit 24 or 24ª, a cock 6, and a pipe 7, so that when the said cock 6 is open bubbles of air can be observed ascending from the orifice 8 through the oil. It is thus rendered possible to ascertain whether the apparatus is working or not. The compressed air entering the lubricator-reservoir produces in the latter a degree of pressure, which is maintained as the level of the oil falls, so that with the cock 6 in a certain position the oil is caused to pass with always uniform speed through the hole 9 and the pipe 10 to the part to be lubricated.

For the purpose of exactly regulating the lubrication by means of the cock 6 the adjusting-screw 11 is provided. If the part to be lubricated becomes heated and for a time requires more lubrication, the lever 12 of the cock 6 can be moved over toward the other side and the cock thus opened to a greater extent. For the purpose of closing the lubricator-reservoir the lever 12 is placed parallel to the pipe 7. Owing to the fact that the oil in the reservoir can be placed under pressure, it is possible within the limits prescribed by the quantity of pneumatic power available to make the oil reach the part to be lubricated independently of the position of the oil-reservoir, so that where the part to be lubricated is difficult of access the oil-reservoir can, if necessary, be placed in a convenient position at a distance below or above it.

The oil is supplied to the reservoirs from a tank 31, arranged at a suitable height, a pipe 32 from which is connected by branch pipes 33 with the various reservoirs. In the modification shown in Fig. 1 the oil from the supply-tank enters the reservoir from the branch pipe 33 through the cock 15 and the conduits 17, 18, and 19 in the spindle 5. During the entrance of oil from the supply-tank the compressed-air pipe 7 is closed by means of the cock 6, and the air-relief cock 20 is opened to allow of the escape of the air in the reservoir through the conduits 21, 22, and 23 of the spindle 5. The filling of the oil-reservoirs under the action of the hydrostatic pressure is almost instantaneous. When it is completed, the cocks 15 and 20 are closed and the cock 6 is opened, so that compressed air can again enter the reservoir and the communication between the latter and the oil-tank and the outer atmosphere is interrupted. In the modification shown in Fig. 3 when the plug 27 is in the position illustrated the oil from the supply-tank passes through the pipe 16 and the passage 25 of the said plug 27, while the air in the reservoir escapes through a smaller passage 26 in the said plug. On the latter being revolved to a certain extent the interior of the reservoir is cut off from the pipe 16 and from the outer atmosphere and can therefore be put into operation by opening the cock 6, whereupon compressed air passes through the pipe 7 and the conduits 24ª and 28 into the oil-reservoir and ascends through the oil in the form of bubbles. By these means (shown in Figs. 1 and 3) the decrease of pressure in the oil-reservoir, which might result during its filling up, is capable of being prevented by the suitable regulation of the escape of the compressed air from the oil-reservoir into the exterior atmosphere by means of the air-cock expressly arranged for this purpose, and by letting the fresh oil flow into the oil-reservoir in such a way through an oil-pipe provided with an adjustable cock communicating with an elevated oil-reservoir that the volume of the oil flowing from the oil-reservoir to the transparent reservoir approximately corresponds with or is larger than the volume of the escaping compressed air. In this manner a decrease of pressure in the oil-reservoir during filling is prevented and the lubrication of the part to be lubricated when situated above the lubricator is not stopped while a new charge of oil flows into the oil-reservoir.

The diagram shown in Fig. 2, in which the oil is conducted from a central tank 31 to the various oil-reservoirs, shows the entire course of the oil. The latter passes from the tank 31, situated above the part to be lubricated in order to overcome the pressure of air in the cups 34 in refilling, through the pipe 32 and the branch pipes 33 to the oil-reservoirs 34, (the latter being illustrated as of the type shown in Fig. 1,) and when the reservoirs are in operation the oil inside them is forced through the pipes 10 to the parts to be lubricated by the action of the compressed air entering the reservoirs through the pipe 35.

I declare that what I claim is—

1. In pneumatic lubricating apparatus the combination of a transparent oil-reservoir, a supply-pipe for compressed air leading to the lower part of the said reservoir, an oil-pipe leading from the lower part of said reservoir to the part to be lubricated, an oil-supply reservoir above the level of the part to be lubricated and a pipe leading from the said supply-reservoir to the transparent reservoir substantially as described.

2. In pneumatic lubricating apparatus the combination of a transparent oil-reservoir, a supply-pipe for compressed air leading to the lower part of the said reservoir, a cock for regulating said air-supply, an oil-pipe leading from the lower part of said reservoir to the part to be lubricated, an oil-supply reservoir above the level of the part to be lubricated, and a pipe leading from the said supply-reservoir to the transparent reservoir, substantially as described.

3. In pneumatic lubricating apparatus the combination of a transparent oil-reservoir, a supply-pipe for compressed air leading to the lower part of the said reservoir, a cock for regulating said air-supply, and oil-pipe leading from the lower part of said reservoir to the part to be lubricated, an oil-supply reservoir above the level of the part to be lubricated, a pipe leading from the said supply-reservoir to the transparent reservoir and a cock adapted to control the communication of the upper part of the transparent reservoir with the exterior atmosphere, substantially as described.

In witness whereof I have signed this specification in the presence of two witnesses.

HERM. SCHMIDT.

Witnesses:
ERNEST H. L. MUMMENHOFF,
IDA CHRIST. HAFERMANN.